July 7, 1953  J. W. MILLER ET AL  2,644,416
APPARATUS FOR FORMING TUBES
Filed Feb. 2, 1949  8 Sheets-Sheet 3
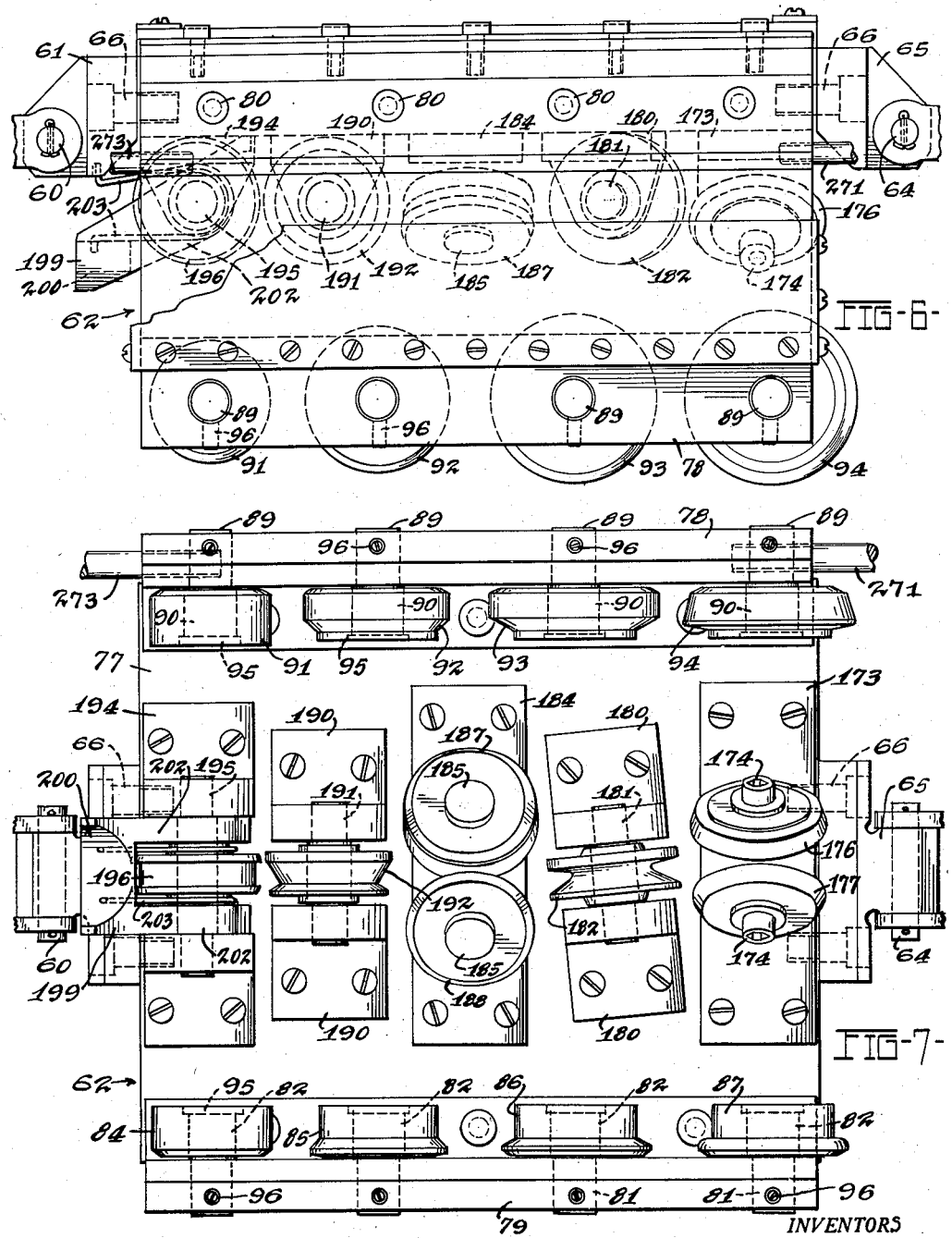
INVENTORS
John W. Miller
BY Arthur J. Barrie
Harry O. Ernsberger
ATTY.

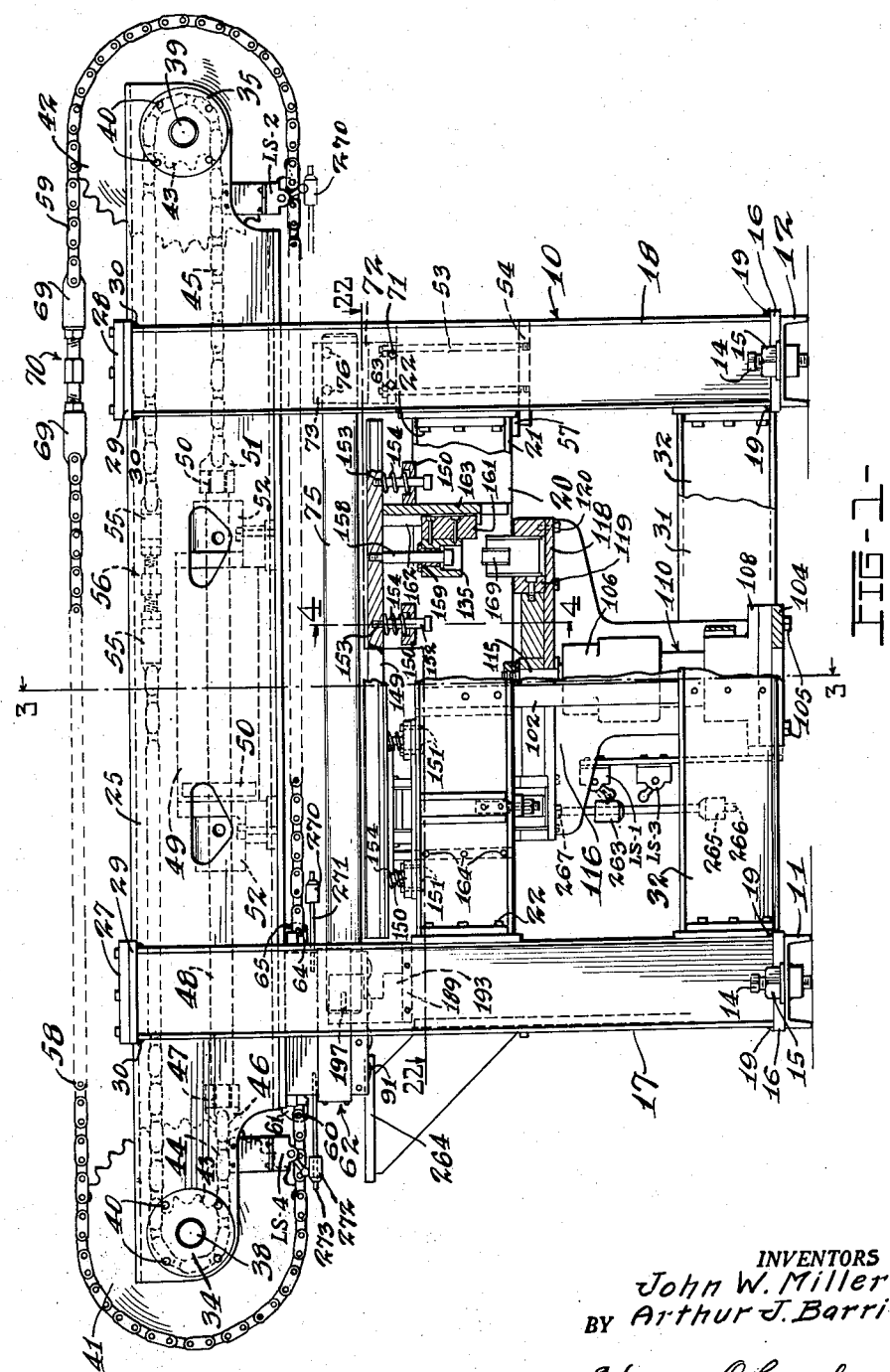

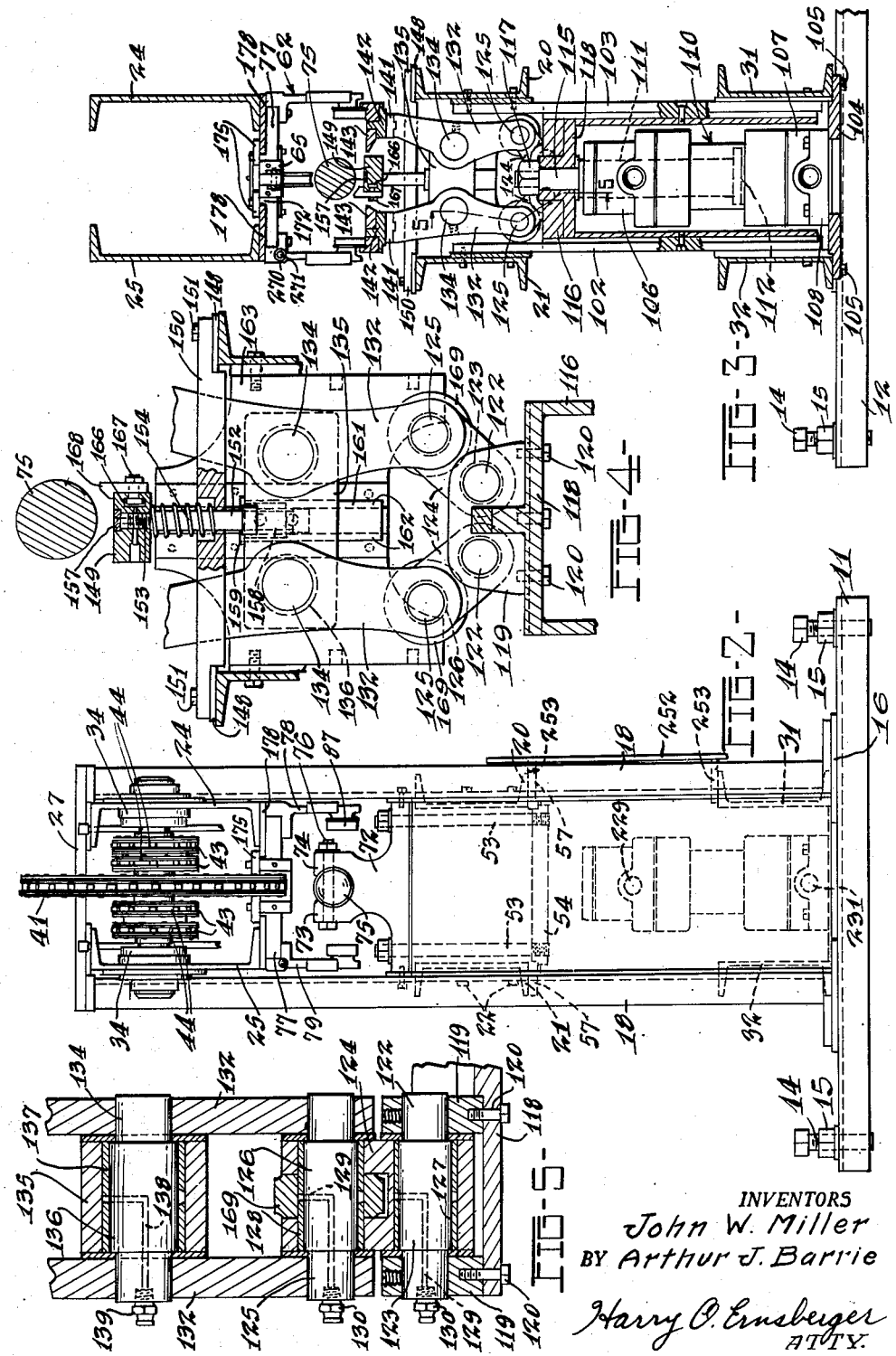

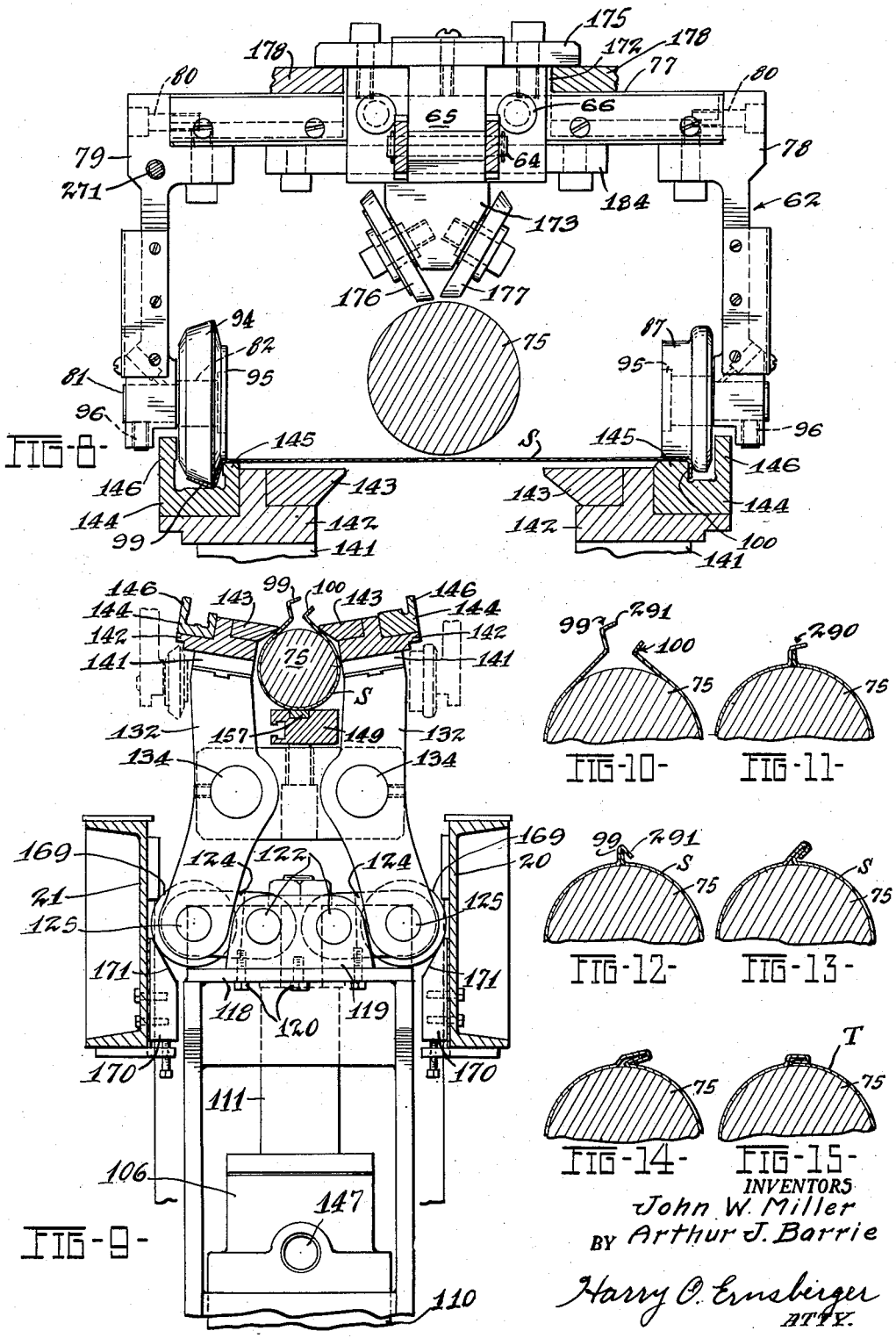

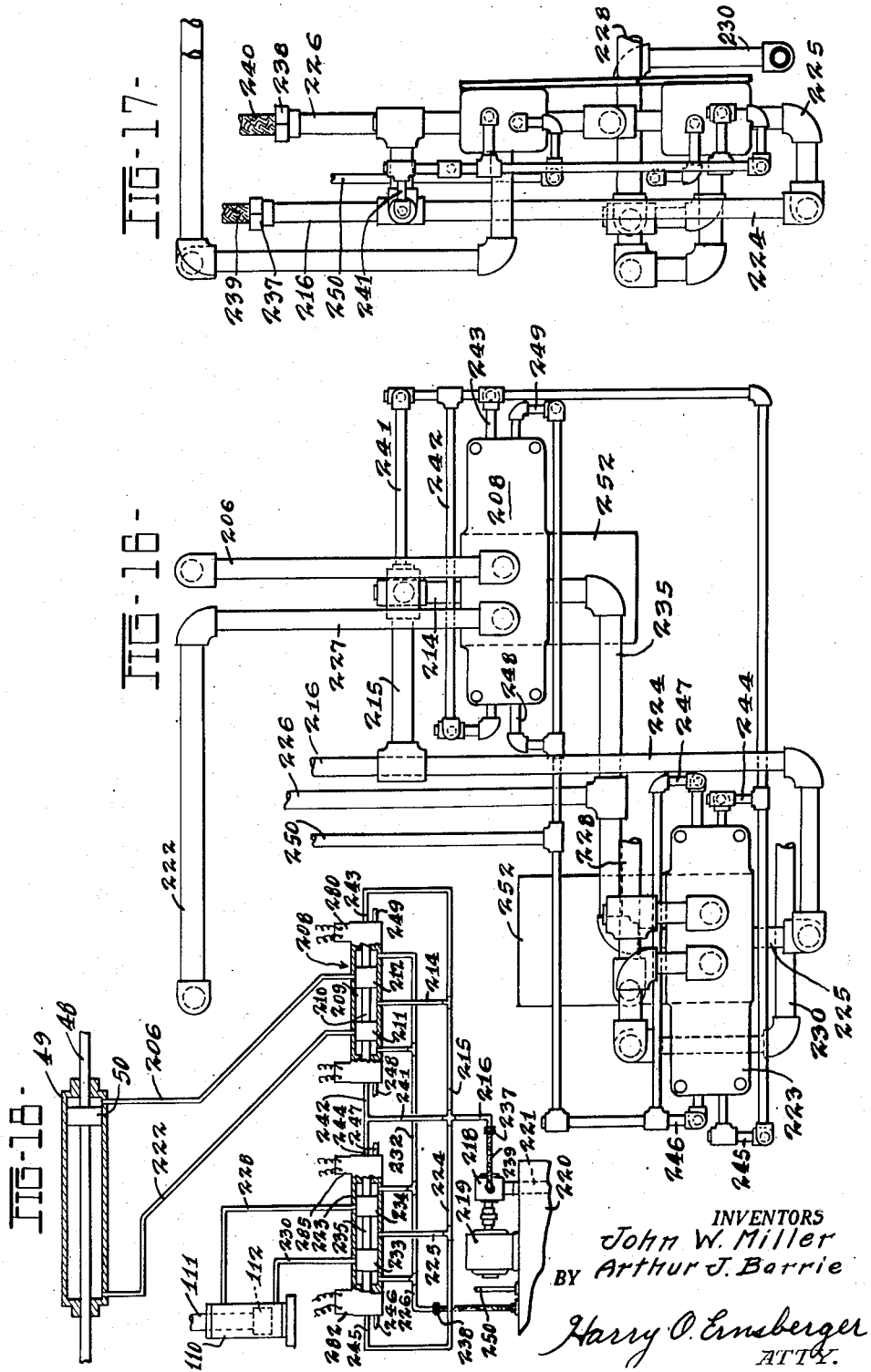

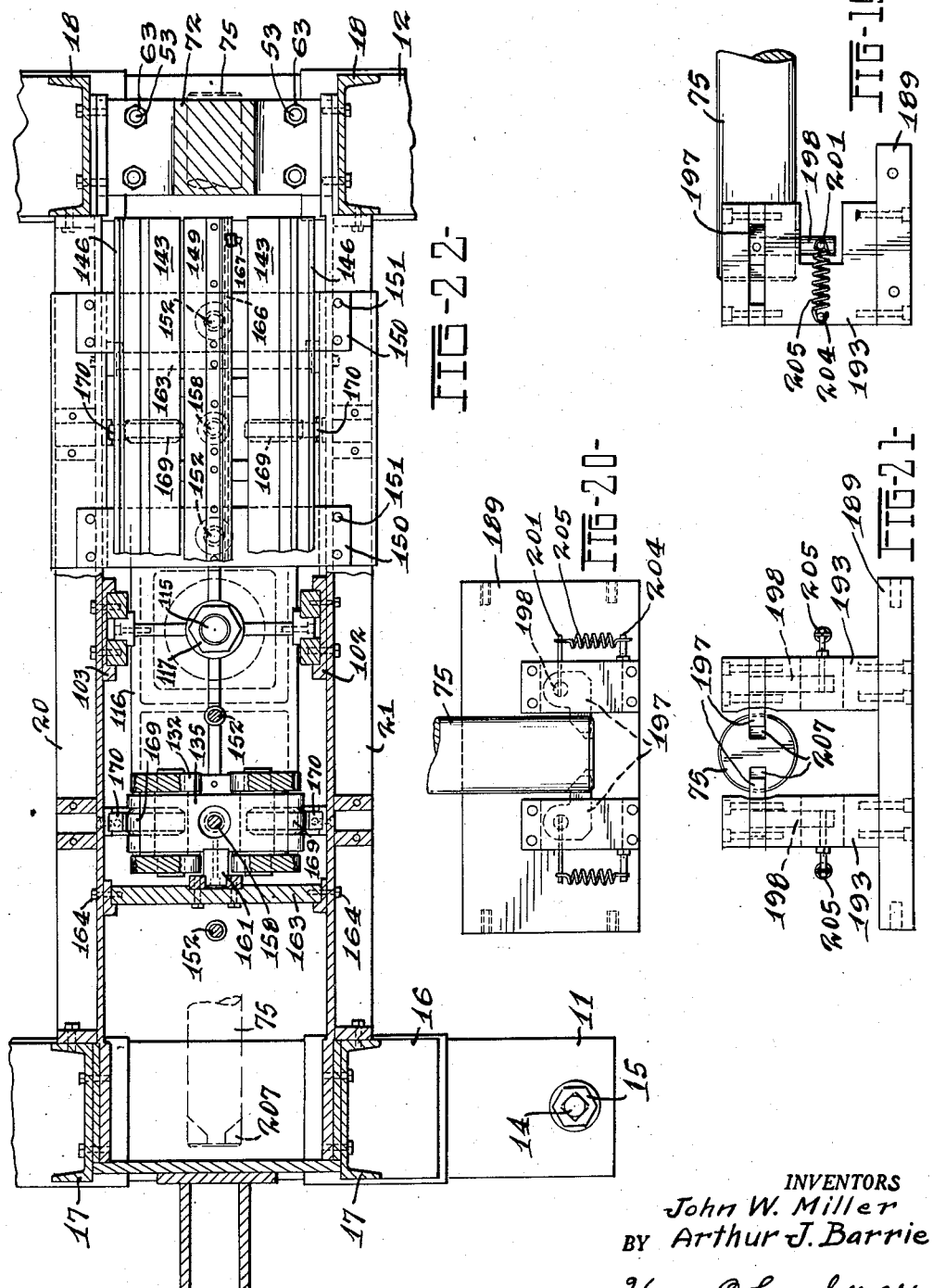

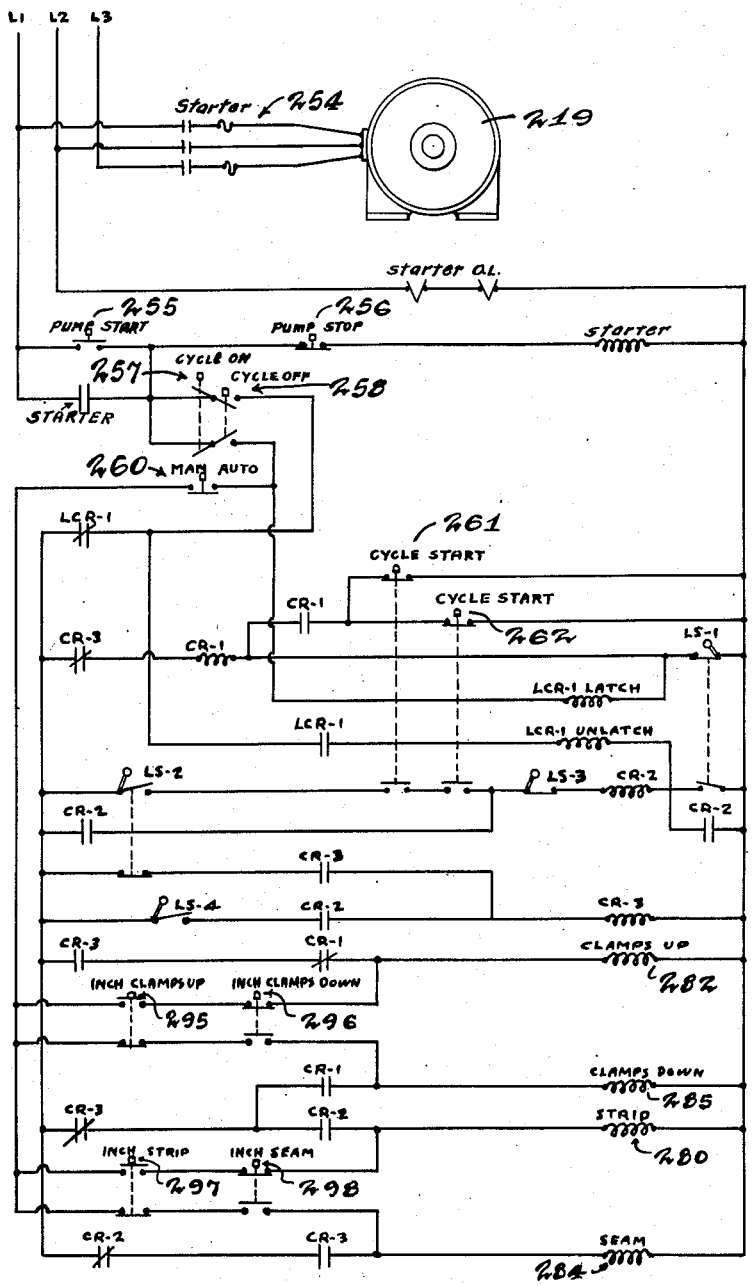
FIG-23-

July 7, 1953     J. W. MILLER ET AL     2,644,416
APPARATUS FOR FORMING TUBES
Filed Feb. 2, 1949     8 Sheets-Sheet 8

| SIGNAL | | DEPRESS P.B. "CYCLE ON" | DEPRESS P.B.S. "CYCLE START" | LS-2 RELEASED | LS-4 OPERATED | LS-1 RELEASED | LS-3 OPERATED | LS-4 RELEASED | LS-2 OPERATED | LS-3 RELEASED | LS-1 OPERATED |
|---|---|---|---|---|---|---|---|---|---|---|---|
| CR-1 | | • | | | | | | | • | • | • |
| CR-2 | | | • | • | • | • | | | | | |
| CR-3 | | | | • | • | • | • | | | | |
| | | | | | | | | | | | |
| CLAMPS UP | | | | | • | • | • | • | | | |
| CLAMPS DOWN | | | • | | | | | | • | • | • |
| | | | | | | | | | | | |
| STRIP | | | • | • | | | | | | | |
| SEAM | | | | | | | • | • | | | |
| | | | | | | | | | | | |
| LS-1 | | | • | • | • | | | | | • | |
| LS-2 | | • | • | | | | | | • | • | • |
| LS-3 | | | | | | • | • | • | | | |
| LS-4 | | | | | • | • | • | | | | |
| | | | | | | | | | | | |
| MACHINE OPERATION | MACHINE IDLE, PUMP RUNNING READY FOR OPERATION. | CLAMPS MOVE TO BOTTOM POSITION OPERATING LS-1. | STRIP & PREFORM OPERATION STARTS - (DELAYED UNTIL "CLAMPS DOWN" VALVE IS CENTERED - LS-2 RELEASED). | STRIP & PREFORM OPERATION CONTINUES TO END OF STROKE-OPERATING LS-4. | CLAMPS MOVE UPWARD RELEASING LS-1. | CLAMPS CONTINUE UPWARD & AT END OF STROKE LS-3 IS OPERATED. | SEAMING OPERATION STARTS RELEASING LS-4. | SEAMING OPERATION CONTINUES TO END OF STROKE- OPERATING LS-2. | CLAMPS MOVE DOWNWARD RELEASING LS-3. | CLAMPS CONTINUE DOWNWARD TO END OF STROKE - OPERATING LS-1. | MACHINE READY FOR NEXT CYCLE. |

FIG-24

INVENTORS
John W. Miller
BY Arthur J. Barrie

Harry O. Ernsberger
ATTY.

Patented July 7, 1953

2,644,416

UNITED STATES PATENT OFFICE 2,644,416

APPARATUS FOR FORMING TUBES

John W. Miller and Arthur J. Barrie, Toledo, Ohio, assignors to Oldberg Manufacturing Company, Grand Haven, Mich., a corporation of Michigan Application February 2, 1949, Serial No. 74,148

7 Claims. (Cl. 113—34)

This invention relates to apparatus for forming members from sheet metal and more especially to the formation of cylindrical members or tubes from metal sheets.

The invention is inclusive of a novel method of processing metal sheets into tubular configuration wherein the metal sheets are maintained relatively stationary during the engagement of a movable carriage therewith for forming portions of the sheets to predetermined shape, the preformed sheets being processed to tubular shape and subsequently engaged by the movable carriage to form seams completing the formation of the tubes.

The invention comprehends the provision of an apparatus for configurating the edge portions of substantially flat strips of sheet metal while in a relatively stationary position and includes means for forming the configurated strips to closed configuration through the interlocking of the edges of the strips.

An object of the invention resides in the provision of apparatus adapted to perform a series of operations upon strips or blanks of sheet metal whereby the flat strips are automatically configurated to tubular shape and are extruded or ejected from the apparatus by means associated with the apparatus brought into operation during the preformation of other blanks to be processed to tubular shape.

Another object of the invention is the provision of an apparatus for producing tubes from sheets or blanks of metal wherein the metal sheets are maintained in relatively stationary position and a sheet configurating means moved relative to the sheets forming a step in the process of forming the tubes.

Another object of the invention resides in the provision of means movable relatively to a sheet of material adapted to operate upon the sheet to preconfigurate edge portions thereof upon movement of the means in one direction of movement, the said means embodying mechanism adapted to perform tube seaming operations upon movement of the means in another direction.

A further object of the invention is the provision of a tube forming mechanism adapted to fashion sheets of material into seamed tubes in which a sheet configurating mechanism and tube shaping means are actuated by hydraulic means, the operation of the hydraulic means being initiated and controlled by electrical means.

Another object is the provision of apparatus for forming seamed tubes of sheet metal wherein a single tube or a plurality of tubes may be fashioned by the apparatus during a complete cycle of operations thereof.

Another object is the provision of a method and apparatus for forming tubes from sheet material wherein the finished tubes are of uniform diameters throughout their lengths and wherein a large number of tubes may be produced in comparatively short periods of time.

Another object of the invention resides in an apparatus including an assembly of mechanisms in which hydraulic actuators and electrically energized means are used as the motivating means for initiating and carrying out the operation of the several mechanisms in forming tubular construction from sheet material, the arrangement of my invention embodying electrical circuit control and fluid control devices intercalated in a manner to automatically perform the several operations of the apparatus in proper sequence.

Further objects and advantages are within the scope of this invention, such as relate to the arrangement, operation and function of the related elements of the structure, to various details of construction and to combination of parts, elements per se, and to economies of manufacture and numerous other features as will be apparent from a consideration of the specification and drawings of a form of the invention which may be preferred, in which:

Figure 1 is a side elevational view illustrating an embodiment of the tube forming apparatus or machine of my invention;

Figure 2 is an end view of the apparatus illustrated in Figure 1;

Figure 3 is a vertical, transverse, sectional view through the machine, the section being taken substantially on the line 3—3 of Figure 1;

Figure 4 is a fragmentary detail sectional view taken substantially on the line 4—4 of Figure 1;

Figure 5 is a detail sectional view taken substantially on the line 5—5 of Figure 3;

Figure 6 is a side elevational view of a mobile means for preforming portions of the metal sheets or blanks and performing the tube-seaming operation;

Figure 7 is a top plan view of the arrangement shown in Figure 6;

Figure 8 is an end view of the structure shown in Figure 6 in assembled relation with other elements of the machine shown in section;

Figure 9 is a fragmentary detail sectional view illustrating the sheet bending means in the position attained at the completion of a sheet bending operation;

Figure 10 is a diagrammatic view showing the configuration of the metal sheet after the same has been formed or bent around a mandrel;

Figure 11 is a diagrammatic view illustrating the initial stage in the formation of the overlapped seam performed by the first of the seam forming rolls;

Figure 12 is a view illustrating the second stage of seam formation attained by the second series of rolls;

Figure 13 is a view showing the third stage of seam formation performed by the central roll of the seam forming means;

Figure 14 illustrates a further step in the formation of the seam;

Figure 15 illustrates the completed seam and tube construction;

Figure 16 is a side elevational view of the oil conveying tubes and control valves for the hydraulic actuating units of the machine of my invention;

Figure 17 is an end view of the tube and valve arrangement shown in Figure 16;

Figure 18 is a schematic diagram of the hydraulic system and units operated thereby;

Figure 19 is a fragmentary side elevational view of the open end of the mandrel illustrating the relatively movable supporting means therefor;

Figure 20 is a top plan view of the arrangement shown in Figure 19;

Figure 21 is an end elevational view of the structure illustrated in Figure 19;

Figure 22 is a horizontal sectional view taken substantially on the line 22—22 of Figure 1;

Figure 23 is a wiring diagram illustrating the electrical system and control for the mechanical apparatus and hydraulic system, and Figure 24 is a chart illustrating various operation cycles of the several mechanisms and electrical control and actuator devices forming elements of the invention.

While the embodiment of the invention as illustrated in the drawings is particularly adapted and utilized for forming tubes from sheets of metal, it is to be understood that I contemplate the utilization of the principles of my invention in various forms of mechanism for forming or configurating metal objects. The arrangement of my invention is adapted to form tubular objects from both perforate and imperforate sheets of metal.

Referring to the drawings in detail, the machine or apparatus of the invention for carrying out the method of the invention is provided with a suitable frame 10 which is inclusive of a pair of spaced, transversely-extending, inverted channel members 11 and 12, each of which is provided with leveling means including a pair of screws 14 which may be locked in adjusted position by means of locknuts 15. Mounted upon the members 11 and 12 are plates 16 upon which are mounted vertically arranged bars or channel members 17 and 18 which are welded as at 19 or otherwise secured to the supporting plates 16 as shown in Figure 1.

The vertically extending pairs of channel members 17 and 18 are joined together intermediate their ends by means of horizontally extending channel members 20 and 21 which are secured to the vertical channels by means of bolts 22 or other suitable securing means. The upper portions of each pair of channels 17 and 18 are connected together by horizontally extending channel members 24 and 25, the channels 24 and 25 projecting beyond the vertical channels 17 and 18 as shown in Figure 1. The upper ends of the pairs of vertical channels 17 and 18 are joined together by means of transversely extending plates 27 and 28, the plates being bolted or otherwise secured to members 29 welded as at 30 to the vertical channel members. The lower portions of the vertical channels 17 and 18 are connected by horizontally extending channel members 31 and 32 as shown in Figures 1, 2 and 3. Through the arrangement of channel members hereinabove described, there is provided a frame which is strong and rigid and one which may be fabricated from structural steel sections.

The end portions of the horizontally extending channels 24 and 25 support pairs of members 34 and 35 which enclose suitable anti-friction bearings in which are journaled shafts 38 and 39. The bearing retaining housings 34 and 35 are secured to the frame members 24 and 25 by means of bolts 40. Mounted upon each of the shafts 38 and 39 are centrally positioned sprockets 41 and 42. Disposed at each side of each of the sprockets 41 and 42 are pairs of sprockets 43 of smaller diameter than the diameter of sprockets 41 and 42. The sprockets are fixed upon the shafts so that rotative movement of the smaller sprockets 43 causes corresponding rotation of the sprockets 41 and 42. The sprockets 43 are fitted with chains 44 and 45, as shown in Figure 1, the adjacent ends of chains 44 being connected to a fitting 46, the latter provided with a threaded bore arranged to receive a threaded tenon 47 formed on the end of a piston rod 48. The piston rod 48 projects through a cylinder 49 and is equipped with a piston 50 which is adapted for reciprocation within the cylinder 49. The cylinder 49 is arranged for the admission of oil or fluid under pressure to actuate the piston for purposes hereinafter explained. The other end of piston rod 48 is formed with a threaded tenon 50' connected to a fitting 51 of the same construction as the fitting 46. The ends of the working cylinder 49 are provided with suitable stuffing glands 52 surrounding the piston rod 48 to prevent escape of fluid from the cylinder along the piston rod. The fitting 51 is connected to chains 45 which over-take the sprockets 43 journaled at the right hand end of the machine as viewed in Figure 1. The other adjacent ends of the chains 44 and 45 are connected to members 55 forming a part of a turnbuckle assembly 56 providing for adjustment of the tension on the chains 44 and 45 to eliminate slack or lost motion.

A chain 58 over-takes the large sprocket 41 and a second chain 59 over-takes the large sprocket 42 disposed at the other end of the frame 10. One end of chain 58 is connected by means of a pin 60 with a fitting 61 secured to a mobile means or carriage 62 shown in Figures 1, 6, 7 and 8. The other end of the chain 59 is connected by means of a pin 64 with a fitting 65 similar to the fitting 61, both fittings being secured to the carriage 62 by machine screws 66 as particularly shown in Figures 6 and 7. The opposite ends of chains 58 and 59 are respectively secured to members 69 which form elements of a turnbuckle 70 of conventional design which is for the purpose of eliminating or taking up lost motion of the chains 58 and 59.

Secured to the pair of vertical frame members 18 by means of bolts 71 is a member 72 shown in Figure 2 provided with upwardly extending portions 73 and 74 which are adapted to support and be clamped to an arbor 75 by means of bolts 76. The member 72 is also anchored by means of rods 53 and nuts 63, the rods having their lower ends threaded into openings in a plate 54, the plate engaging bars 57 welded to the channel members 20 and 21. As particularly shown in Figure 1, the arbor 75 extends longitudinally of the machine and in parallelism with the direction of travel of the carriage 62. The arbor or mandrel 75, is disposed in a manner providing a form about which the metal blanks or sheets may be bent or wrapped during the process of forming the tubes.

The carriage 62 is arranged to reciprocate lengthwise of the machine and is provided with two series or sets of form rolls, one set being for the purpose of bending and configurating the edges of the blanks while the second set is utilized for performing the tube seaming operation. As particularly shown in Figures 6, 7 and 8, the carriage proper includes a horizontal frame plate 77 and depending side wall members 78 and 79, the latter being secured to the plate 77 by means of machine screws 80. The lower portion of the side wall 79 of the carriage is provided with a plurality of transversely extending cylindrical bores adapted to receive tenon portions 81 of stub shafts 82. In the embodiment illustrated, there are four rolls carried upon journal members 82 adjacent the side wall 79, the rollers being designated 84, 85, 86 and 87 as shown in Figure 7. The side wall 78 of the carriage is provided with a plurality of cylindrical bores adapted to receive tenon portions 89 formed on stub shafts 90 the latter journally supporting rolls 91, 92, 93 and 94. The first pair of rolls 84 and 91 is for the purpose of holding the metal sheet from which the tube is to be formed as the form rolls on the carriage engage and configurate portions of the sheet. During the period that the rolls 84 through 87 and 91 through 94 pass over the metal blank, it is in the position shown in Figure 8 disposed beneath the arbor or mandrel 75. The three pairs of form rolls 85, 92; 86, 93 and 87, 94 are for the purpose of bending and forming the opposite edge portions of the blank or sheet "S," which operation takes place during longitudinal movement of the carriage from the right hand end of the frame to the left hand end thereof as viewed in Figure 1. The several stub shafts 82 and 90 are provided with head portions 95 to prevent displacement of the rolls, the shafts being retained in the bores formed in the side walls 78 and 79 by means of set screws 96 or other suitable securing means. After the carriage 62 has passed over the sheet "S," the respective edges of the sheet are formed or configurated to the contour indicated at 99 and 100 shown in Figure 8.

The means for initially supporting the metal blank "S" and for shaping the blank to tubular configuration will now be described. Disposed vertically of the machine and connected to the pairs of channels 20, 31 and 21, 32 are spaced vertical guides or members 102, 103 which are fixedly secured to the said channel members by suitable means. The lower flange members of channels 31 and 32 are connected by a plate 104 which is secured thereto by means of bolts 105. Mounted upon the plate 104 is a cylinder 110, the lower portion 107 thereof having a flange 108 suitably bolted or otherwise secured to the plate 104. The other end of the cylinder 110 is provided with a head portion 106 through which projects a piston rod 111 which carries a piston 112 slidably disposed within the cylinder 110.

The upper end of the piston rod 111 is provided with a tenon 115 which projects through an opening in a member or yoke 116 and is secured thereto by means of a nut 117. The yoke is inclusive of a horizontally disposed plate portion 118 to which is fastened pairs of brackets 119 as particularly shown in Figures 4 and 5 the brackets being secured to the plate 118 by means of bolts 120. In the embodiment illustrated, there are two pairs of brackets, each pair being formed with two sets of aligned openings to accommodate shafts or pivot pins 122. The central portion 123 of each of the pivot pins 122 is of slightly larger diameter than the end portions and forms a journal for connection with toggle links 124. The links 124 are connected to pins or shafts 125 having enlarged central portions 126, the central portions 123 and 126 being surrounded by bearing bushings 127 and 128. The pivot pins or journals 123 and 126 are provided with lubricant channels 129 and fittings 130 through which lubricant may be supplied to the bearings 127 and 128.

Pivotally connected to the end portions of pins 125 are spaced arms or clamping members 132 which extend upwardly and are pivotally connected by means of shafts 134 with blocks or members 135. The central portions 136 of the pins 134 are surrounded by bearing bushings 137 carried in bores formed in the blocks 135. The pins 134 are provided with channels 138 and lubricant fittings 139 for conveying lubricant to the bearing surfaces of bushings 137.

The clamps or members 132 extend above the pivot pins 134 and are formed at their upper ends with flanges or pad portions 141. Mounted upon the flanges 141 are horizontally extending bars 142 which are recessed to accommodate hardened inserts or members 143. The members 142 are also recessed to accommodate and support members 144. The inserts or members 143 and 144 are bolted or otherwise fixedly secured to the arms or clamps 132. Each of the members 144 is provided with a raised portion or land 145 which forms an initial support for the blanks or sheets "S" as shown in Figure 8. Each of the members 144 is provided with an upwardly extending flange 146 which serves as positioning means for centering the sheets "S" prior to the movement of the carriage 62 over the sheets. After the carriage 62 has moved over the sheet "S" and configurated or preformed the edges of the sheet as shown in Figure 8, pressure fluid is admitted to the lower end of the cylinder 106 beneath the piston 112. The pressure fluid forces the piston and piston rod upwardly moving the yoke 116 and blocks 135 upwardly together with the brackets 119 and clamps 132 and parts carried thereby. This movement causes the inserts 143 to engage the sheet or blank "S" and wrap the same around the arbor 75 to a substantially tubular configuration as shown in Figures 9 and 10. The preformed edge portions 99 and 100 are thus brought to the relative positions shown in Figure 10 preparatory to the formation of the seam to form a closed tube.

Means are provided to hold the blank or blanks "S" in engagement with the arbor 75 when the blanks are folded around the arbor by upward movement of the arms 132. This means is inclusive of a bar 149 which extends in parallelism with and beneath the arbor 75. Mounted upon the uppermost flanges of the channel members 20 and 21 are plates 148 supporting transversely extending strips or members 150 which are secured by means of bolts 151. The bars 150 are provided with openings to accommodate headed shafts 152 as shown in Figure 1, the shafts being formed with reduced portions 153 threaded into suitable openings formed in the bar 149. The transversely extending members 150 are recessed to receive the extremities of coil springs 154 which surround the shafts 152. The bar 149 is provided with a longitudinal recess in which is secured a hardened insert or pad 157 which engages the blanks "S" in a manner as hereinafter explained to hold the blanks in contact with the mandrel 75 during the bending operation. The bar 149 is also provided with threaded openings to receive a pair of headed pins or shafts 158. The shafts 158 extend through guide bushings 159 fixedly secured in fittings or blocks 135. Secured to each of the fittings 135 is a block 161 slidably mounted in ways 162 formed on brackets or members 163 which are secured to channel members 20 and 21 by means of bolts 164. In this manner the bar 149 is held in its lowermost position by the heads of bolts 158 engaging the bushings 159 secured in the blocks 135, but upon upward movement of the arms 132 and block 135, the bar 149 is moved upwardly under the expansive force of springs 154.

The apparatus of my invention may be utilized to form a single sheet around the arbor 75 or to form a number of comparatively short tubes during a single cycle of operation of the apparatus by positioning several blanks beneath the mandrel 75 in spaced relation on the bars 143. When several blanks are thus used, means is provided to separate the blanks longitudinally. To accomplish this the bar 149 is provided with a longitudinally extending T-shaped slot 166 which is arranged to receive and accommodate headed bolts 167 which secure lugs or abutments 168 to the bar 149. The lugs function to prevent overlapping of the several blanks when the machine is utilized to form several short blanks simultaneously into tubes. When a single tube is to be formed only one lug 168 is used.

Means are provided for initiating and controlling inward movement of bars 143 carried by the arms 132 during the wrapping of a blank around the mandrel 75. To this end cam followers or rollers 169 are journaled on the bearing bushings 128 surrounding the shafts 125 as shown in Figures 5 and 9. The rollers 169 are adapted for cooperation with cams or cam members 170 mounted adjacent the inner walls of channels 20 and 21. The upper portions of members 170 are formed with canted or angularly disposed surfaces 171 which as viewed in Figure 9 permit the lower ends of the arms 132 as they are moved upwardly to pivot outwardly about the axes of pins 134 resulting in a corresponding inward movement of forming bars 143. Thus when the forming bars 143 are moved to their innermost positions, the actuating links 124 assume the positions shown in Figure 9. After a blank "S" has been bent around the mandrel 75 to the position shown in Figure 9, a return movement of the carriage 62 is initiated to complete a tube forming operation. The carriage plate 77 is provided with a bracket 173 upon which is supported shafts 174 upon which are journaled form rolls 176 and 177. These rolls in passing over the formed edges of a blank while positioned on the mandrel 75 bring the preformed edges into the relation shown in Figure 11. Positioned adjacent bracket 173 is a pair of brackets 180 carried by the plate 77 and which supports a shaft 181. Journaled upon the shaft is a form roll 182 of a suitable configuration to bend the edge portion 291 of the blank to the configuration shown in Figure 12. Mounted upon plate 77 and positioned adjacent the bracket 180 is a bracket 184 supporting a pair of angularly arranged shafts 185 supporting the form rolls 187 and 188 which operate or function to bend the interlocking edges of the blank "S" to the position shown in Figure 13. Disposed adjacent the bracket 184 and secured to plate 77 is a pair of brackets 190 upon which is mounted a shaft 191 upon which is journally supported a form roll 192. The periphery of the form roll 192 is of a configuration to further bend the interlocking edges of the blank to the position shown in Figure 14. Secured to plate 77 and mounted adjacent bracket 190 is a bracket 194 upon which is mounted a shaft 195, the latter journally supporting a form roll 196 which is suitably shaped to complete the formation of the seam by interlocking the overlapping edges of the tube construction as shown in Figure 15.

The form rolls herein above described are arranged to successively engage a blank to complete the tube formation through the individual consecutive operations performed upon the juxtaposed edges of the blank. Immediately upon completion of return movement or travel of the carriage 62 the piston in cylinder 111 is retracted by fluid pressure as hereinafter explained so that the arms 132 and forming bars 143 return to their initial positions as shown in Figure 3 thus leaving the completed tube or tubes upon the mandrel 75. Means are provided for guiding the carriage in its reciprocating movement. The plate 77 is formed with an upwardly projecting portion 172 to which is secured a plate 175. Secured to the lower flanges of channels 24 and 25 are longitudinally extending bars or ways 178 as shown in Figures 2 and 3. The ways 178 extend into the spaces between the lower surface of plate 175 and the upper surface of plate 77 providing for snug, but slidable movement of the carriage along the ways 178.

Means are provided for stripping the finished tube or tubes from the arbor 75 upon subsequent movement of the carriage 62 in carrying out the operation of bending the edges of the blanks in the subsequent cycle. As shown in Figure 6, the stripping means includes a finger 199 which has a lower surface 200 of concave curvature of a dimension to coincide with the cylindrical surface of the mandrel 75. The stripper member is of U-shaped construction having leg portions 202 journaled upon the shaft 195 which supports the seam-closing roll 196. The stripper is urged into engagement with the mandrel 75 under the influence of a spring 203 the ends of which are respectively engaged with the stripper member 199 and with the fitting or bracket 61 mounted upon the carriage as shown in Figure 6.

Means are provided for supporting the mandrel 75 at its open end in order to prevent any deflection of the mandrel during the operation of wrapping or bending the blanks around the mandrel and during the seam forming operations. As shown in Figures 19, 20 and 21, the mandrel supporting means is arranged to permit the automatic stripping or removal of finished tubes from the mandrel. Mounted upon the machine frame adjacent the open end of the mandrel 75 is a plate 189 supporting a pair of blocks 193 provided with horizontal slots adapted to receive fingers 197.

Each of the fingers 197 is secured to a vertically disposed shaft 198 journaled in a block 193, the finger being adapted for pivotal movement about the axis of the shaft 198. Secured to each shaft is a projecting pin 201 connected to a suitable anchor 204 by means of a coil spring 205. The end of mandrel 75 is formed with horizontally disposed slots 207 of a dimension to snugly, yet slidably, receive the projecting portions of the fingers 197. The springs 205 constantly urge the fingers into the slots 207 in the mandrel 75 to prevent any vertical deflection of the mandrel during tube forming operations. When the carriage 62 is actuated from its initial position at the start of a cycle, the stripping finger 199 engages a finished tube on the mandrel and moves same toward the left end of the mandrel as viewed in Figure 1. When the tube engages the fingers 197, the fingers are thereby rotated about the axes of shafts 198 out of the slots 207 to permit the discharge of the tube from the mandrel. If several tubes are simultaneously formed on the mandrel during a single cycle of the machine, the stripping finger 199 engages the rearmost tube causing an abutting of the several tubes, the foremost of which engages the fingers 197 swinging the latter out of the path of the tubes to facilitate their automatic removal from the mandrel.

The several mechanisms of the machine in the embodiment illustrated are actuated by hydraulic means, said means embodying valve mechanisms which are electrically actuated and controlled, the several electrical control means being intercalated so as to establish and insure proper sequence of operation of the various mechanisms. The hydraulic system includes the horizontal working cylinder 49 containing piston 50 and piston rod 48 for actuating the chains 44 and 45 for reciprocating the carriage 62. The system includes a second working cylinder 110 in which is disposed a piston rod 111 and a piston 112 which is adapted to operate the arms on clamps 132 and associated elements for wrapping or bending the metal blanks around the mandrel 75. One end of the working cylinder 49 is connected by means of a tube or pipe 206 with a valve mechanism contained in a housing 208, the valve mechanism being of a so-called 4-way type actuated by hydraulic pilot valve mechanism (not shown) which is directly actuated by solenoid mechanisms. The valve mechanism and fluid connections of the hydraulic system are shown in Figures 16 and 17 and in schematic form in Figure 18. As shown diagrammatically in Figure 18, the valve mechanism 208 includes a valve cylinder 209 in which is disposed a rod 210 carrying valves or plungers 211—212. The cylinder 209 is connected to a source of pressure fluid by means of tubes 214, 215 and 216, the source of fluid pressure being a hydraulic pump 218 driven by an electric motor 219 or other suitable source of power. The pump and motor are preferably directly mounted or supported upon a reservoir 220 containing a supply of oil or other hydraulic medium. The pump 218 is provided with a tube 221 which extends into the reservoir for supplying oil to the pump. The other end of the working cylinder 49 is connected by means of a tube or pipe 222 with the hydraulic valve mechanism contained in housing 208. Pressure fluid is also conveyed to a second set of hydraulic control valves contained within a housing 223 by means of tubes 224 and 225. The valve mechanism contained within the valve casing 223 is connected with each end of the vertically disposed working cylinder 110 by means of tubes 228 and 230. The valve housing 223 contains reciprocating valve mechanism including plungers 233 and 234 mounted upon a rod 235. Reciprocation of the rod 235 by electrically controlled pilot hydraulic means (not shown) directs fluid to and from the cylinder 110 for operating the arms or clamps 132 shown in Figures 3 and 4. A fluid return circuit is provided connecting the valve mechanisms in housings 208 and 223 with the fluid reservoir 220. This return circuit comprises the tubes 232 and 226. The fluid pressure supply tube 216 and the fluid return tube 226 respectively connected by means of unions 237 and 238 with flexible tubes 239 and 240 connected respectively with the fluid pump 218 and the reservoir 220. Through the use of flexible tubes, the pump and reservoir unit may be disposed at a position remote from the tube forming apparatus.

The main valve mechanisms contained within the valve casings 208 and 223 are adapted to be operated by supplemental hydraulic pilot valve mechanisms (not shown) which in turn are actuated by solenoid mechanisms contained within the valve housings. The supplemental hydraulic valve actuating circuit, also referred to herein as a hydraulic pilot circuit, is illustrated in Figures 16 through 18 inclusive. The main pressure feed line 216 is connected to the supplemental pilot valve mechanism by means of tubes 241, 242, 243, 244 and 245. A return circuit for the supplemental or hydraulic pilot mechanism is inclusive of tubes 246, 247, 248 and 249 which connect with common vent or return pipe 250 which is connected to the reservoir 220.

The valve casings 208 and 223 are mounted upon plates 252 by means of bolts (not shown) the plates being welded to brackets 253, the latter being welded or otherwise secured to flanges of the channel members 20 and 31 as shown in Figure 2.

The electrical circuits for controlling the hydraulic pilot circuits which in turn actuate the main valve mechanism for directing pressure fluid to actuate pistons 50 and 112 in the working cylinders 49 and 110 are shown diagrammatically in Figure 23. The pump operating motor 219 is of the 3-phase type connected to the current supply designated L-1, L-2 and L-3 in Figure 23. The motor starter mechanism is indicated at 254. A series of manual or push-button controls are arranged in a suitable switch housing (not shown) supported near the operator's position at the front of the machine. The series of controls includes a normally open momentary contact manual switch 255 for the purpose of closing the circuit to the pump motor 219, numeral 256 designating a normally closed momentary contact manually operated switch for stopping the pump. A cycle initiating maintained contact switch is shown at 257 and mechanically interlocked with a maintained contact emergency stop switch 258 is intercalated in the system for permitting or interrupting respectively the cycle of operations at any time. 260 is a normally closed momentary contact switch provided with means for latching and locking the contacts in open position for a purpose hereinafter explained.

Double throw manual switches 261 and 262 are provided for initiating the cycling of the machine, both of which must be depressed or closed to initiate operation of a cycle. LCR-1 designates a latched-in relay while CR-1, CR-2 and CR-3 designate current relays for energizing the hydraulic pilot valves. LS-1 designates a double throw limit switch shown in Figures 1 and 23 which is operated when the arms or clamps 132 are in their down position. LS-2 is a double throw limit switch which is operated when the carriage 62 is at one end of the machine at the completion of a tube seaming stroke or cycle. LS-3 is a normally closed limit switch which is opened or operated when the clamps or arms 132 are in their up position, that is, a position completing the wrapping of a sheet blank "S" around the mandrel 75. Both of the limit switches LS-1 and LS-3 are actuated by means of members 264 and 265, each being adjustably supported upon a vertically depending rod 266 supported by member 116. The rod 266 is preferably threaded into an opening in member 116 and is locked in position by means of a nut 267. LS4 shown in Figures 1 and 23 designates a normally open limit switch which is operated when the carriage has moved to one end of the mandrel 75 from its initial position and after the rolls carried thereby have preformed the edges of the blank to the configuration shown in Figure 8. The limit switch LS-2 is adapted to be operated by a member 270 mounted upon a rod 271 supported at one end of the carriage 62. The limit switch LS-4 is adapted to be operated by a member 272 carried by rod 273 mounted upon the other end of the carriage 62.

LCR-1 illustrated in the circuit in Figure 23 is a latched-in type of current relay which functions as a safety device to prevent damage to the machine. The electrical circuits of Figure 23 may be fully understood by description of the operation of the machine with particular reference to the operation chart of Figure 24 in view of the circuit diagram of Figure 23, the mechanisms illustrated in Figures 1 through 15, and the schematic diagram of the hydraulic circuits shown in Figure 18. Assume for purposes of explanation of operation of the apparatus that the carriage 62 is in its initial or starting position at the right hand end of the machine as viewed in Figure 1, the bars 143 carried by the clamps or arms 132 are then in the lowermost position and the clamping bar 149 spaced beneath the mandrel 75 as shown in Figures 1 and 3. When it is desired to operate the machine, the operator depresses the manual switch 255 (see Figure 23) which energizes the starter 254 causing rotation of motor 219 and operation of the fluid pressure pump 218. The operator then depresses or operates the "cycle on" switch 257, which connects automatic control circuit network to current source, then places one or more sheets or blanks of metal in the space between the center bar or pad 149 and the mandrel 75 so that the sheets are supported upon the lands 145 of bars 143. If more than one sheet metal blank is inserted at the same time, then two or more lugs 168 are used and adjusted by manipulating the retaining bolts 167 to properly space the sheets "S" longitudinally of the machine. The sheets are properly positioned transversely of the machine by means of the flanges 146 formed on members 144 carried by the arms 132 as shown in Figure 8. The operator then depresses or closes both manually operated switches 261 and 262. The limit switch LS-2 is in operated position having been moved to this position by member 270 when the carriage 62 returned to its initial or starting position. The limit switch LS-1 is in operated position, having been moved to this position by member 263 when clamps or arms 132 returned to their initial or starting position. The depressing or closing of both switches 261 and 262, provides current flow through CR-2 current solenoid, and the associated change of condition of CR-2 current contacts causes current flow through CR-2 current coil to be self-sustaining, regardless of release of switches 261 and 262 and LS-1 and LS-2. The switches 261 and 262 are then released by the operator. Further effect of the change of condition of CR-2 current contacts is to permit current flow through strip solenoid 280 (see Figure 18) which shifts the valve rod 210 and the valve members 211 and 212 in a right hand direction to establish pressure fluid communication between tubes 214 and 206 through the valve chamber 209. In this position pressure fluid flows from the pump 218 through tubes 216, 215, 214 and 206 into the right hand end of the cylinder 49 as viewed in Figures 1 and 18 causing the piston 50 and piston rod 48 to move in a left hand direction. This movement of piston rod 48 actuates the chains 44 and 45 rotating the sprockets 34 and 35 and the sprockets 41 and 42 to cause movement of chains 58 and 59 and hence movement of the carriage 62 in a left hand direction as viewed in Figure 1. Due to the difference in the sizes of the sprockets 34 and 35 as compared with the sprockets 41 and 42 the carriage 62 will move several times the distance traversed by the piston 50. By this means a large movement of the carriage 62 may be had with a comparatively short travel of the piston 50 in the cylinder 49 and thus attain a high rate of speed for the carriage 62 with a transfer of a minimum amount of fluid.

As the carriage 62 begins its movement in a left hand direction as viewed in Figure 1, the rolls 84 and 91 on the carriage engage the edge portions of the sheet metal blank "S" and hold the blank tightly against the lands 145 of members 144 shown in Figure 8. As movement of the carriage progresses, the sets of rolls 85, 92; 86, 93; and 87, 94 successively engage and progressively form or configurate the opposite edges of the blank to the shape illustrated in Figure 8. Thus as the carriage 62 reaches the end of its movement in a left hand direction, that is, when it reaches the position shown in Figure 1, the blank or blanks disposed beneath the mandrel 75 have their edge portions preformed to the shape illustrated in Figure 8.

When the carriage reaches this position, the member 272, carried by rod 273 supported on the carriage, engages and actuates the limit switch LS-4 to closed position, limit switch LS-2 having been released upon initial movement of the carriage from its starting position. The closing of limit switch LS-4 causes current flow through current relay CR-3 energizing the solenoid 282 which shifts the valve rod 235 and valve members 233 and 234 in a left hand direction as viewed in Figure 18 to admit pressure fluid into the cylinder 110 beneath the piston 112 through the tubes 230, 225, 224 and 216. The admission of pressure fluid beneath the piston 112 moves the piston 112 and piston rod 111 carrying the yoke member 116 upwardly together with the arms or clamps 132 which are connected to the yoke 116 by means of links 124. As the clamps or arms 132 and links 124 move upwardly the member 263 moves out of engagement with limit switch LS-1 to release the same and the blocks 135 (see Figure 1) are simultaneously moved upwardly, permitting the springs 154 to urge the central bar or pad 149 and the insert 157 carried thereby toward the mandrel 75, the insert 157 contacting the sheet or sheets "S" to hold the central portions of the same in frictional engagement with the mandrel 75. As the arms or clamps 132 progress further in their upward movement the rollers 160, in engagement with the cams 170, are brought into engagement with the canted surfaces 171 of the cams, permitting the lower ends of the arms 132 to move outwardly about the pivotal axes of the shafts 134 and causing the links 124 to assume a more nearly horizontal position as shown in Figure 9. As the lower ends of the arms 132 move outwardly, the upper ends and the bars 143 members 144 carried thereby are moved inwardly to the position shown in Figure 9. This upward and inward movement of the bars 143 wraps or bends the metal blanks "S" around the mandrel or arbor 75 to the position shown in Figure 9 with the preformed edges 99 and 100 of the blank in juxtaposed relation as shown in Figure 9. Further effect of current flow through CR-3 is to interrupt current flow through strip solenoid 280 causing an interruption of pressure fluid communication to cylinder 49.

When the yoke 116 connected to the arms 132 reaches the position shown in Figure 9, the limit switch LS-3 is actuated by member 265 which interrupts current flow through current relay CR-2 and, by virtue of CR-2 current contact reversal, to energize the solenoid 284 (see Figure 18). The energization of solenoid 284 causes the valve members 211 and 212 in the valve casing 208 to be moved in a left hand direction as viewed in Figure 18 which brings the fluid pressure tube 214 into registration with the tube 222 through the valve chamber 209 so as to direct fluid under pressure from the pump 218 to the left hand end of the cylinder, the pressure acting to move the piston 50 and rod 48 in a right hand direction. The valve member 212 is simultaneously moved to a position to bring the tube 206 into registration with the vent tube 232 so as to permit return flow of fluid or liquid from the right hand end of cylinder 49 to the reservoir 220. Movement of the piston 50 and rod 48 in a right hand direction as viewed in Figures 1 and 18 moves the carriage 62 in the same direction for the reason that the reverse movement of piston rod 48 causes corresponding reversal of movement of the chains 58 and 59. Immediately upon the start of return movement of the carriage 62 in carrying out the seaming operations, member 273 moves out of engagement with the limit switch LS-4 which releases the same.

With particular reference to Figures 6, 7, 8 and 10 through 15 inclusive, the several sets of rolls mounted centrally of the carriage 62 successively engage the juxtaposed edges 99 and 100 of the blank "S" to complete the formation of the tube by completion of a seam therein. Thus on return movement of the carriage, the rolls 176, 177 first engage the edges 99 and 100 as shown in Figures 9 and 10 to bring them into contact as shown at 290 in Figure 11. The roll 182 next engages the flange portion 291 of edge 99 to bend the same into a canted or angular position as shown in Figure 12. The rolls 187 and 188 then engage the edge portion 99 folding the flange 291 thereof into full overlapping relation with the edge 100 and bending the overlapped portions to the position shown in Figure 13. The roll 192 then engages the configuration of overlapping edge portions illustrated in Figure 13 and further bends them to the position shown in Figure 14. The last roll 196 of the series then engages the configuration of overlapping edges as shown in Figure 14 and completes the formation of the seam as shown in Figure 15 to form the finished tube. Immediately after the roll 196 is disengaged from the completed tube, the carriage 62 reaches its initial or starting position. As the carriage approaches this position, the member 270 engages and operates the limit switch LS-2 to interrupt current flow through current relay CR-3 and the change in condition of CR-3 current contacts results in current flow through CR-1 current coil. Further effect of CR-3 current contact reversal is to interrupt current flow through coil 284 to energize solenoid 285. The energization of solenoid 285 moves the valve rod 235 and valves 233 and 234 in a right hand direction as viewed in Figure 18 so as to establish a flow of liquid under pressure from the pump 218 through tubes 216, 224, 225 and 228 into the cylinder 110 and above the piston 112. Movement of the valve members 233 and 234 to the right hand position also establishes communication for the return flow of fluid from the space beneath the piston 112 in cylinder 110 through tubes 230 and 226 into the reservoir 220. The introduction of fluid under pressure above the piston 112 moves the same downwardly carrying with it the yoke 116, blocks 135, arms or clamps 132, bars 143 and 144 carried thereby and withdraws the pad 149 carrying hardened insert 157 from the completed tube formed upon the mandrel 75. The parts above mentioned in their lowermost position are shown in Figure 3. As will be apparent from the chart, Figure 24, and the circuit diagram of Figure 23, the limit switch LS-1 is operated when the arms 132 reach their normal or lower position by reason of the engagement of member 263 (Figure 1) with this limit switch. As the clamps or arms 132 initiate their downward movement the limit switch LS-3 is released. It is pointed out that the circuit is now not in the exact condition that pertained at initial start, inasmuch as current flow continues through CR-1 current solenoid, and through "clamps down" solenoid 285, and pressure fluid communication remains established to the upper end of cylinder 110. This condition pertains at start of all cycles except initial starting cycle. Cycle functioning is the same, however, except that the depressing or closing of both switches 261 and 262 has a further function of interrupting current flow to CR-1 current solenoid, and resultant change of condition of CR-1 current contacts interrupts current flow through 285 solenoid, which interrupts pressure fluid communication to cylinder 110 through tube 228.

The foregoing is an explanation of the operation of a complete cycle of the apparatus with the exception of the removing or stripping of the finished tube or tubes "T" from the mandrel or arbor 75. Upon return movement of the carriage 62 to its initial or starting position at the right hand end of the machine as shown in Figure 1, the tube stripping device or finger 199 overrides the finished tubes on the mandrel. When the carriage 62 reaches its initial or starting position, the tube stripper 199 engages the mandrel or arbor 75 with the curved surface 200 of the stripping device fitting the cylindrical contour of the mandrel. The stripping device is urged to this position under the influence of the spring 203. Upon the subsequent movement of the carriage in the succeeding cycle of the machine to form another tube or tubes from a blank or blanks inserted into the machine, the stripping device 200 engages the edge of the first tube, movement of the carriage acting to slidably remove or strip the finished tube or tubes off the end of the arbor and onto a receiving platform 264 supported at the end of the machine as shown in Figure 1. The tube or tubes being moved off of the mandrel 75 by the stripper finger 199 engage the mandrel supporting fingers or latches 197 swinging the latter out of the path of the tubes. Immediately upon discharge of the last tube on the mandrel, the fingers or latches 197 are returned into the slots 207 in the end of the arbor under the influence of the coil springs 205. The tubes may then be removed from the platform 264 by the operator.

As shown diagrammatically in Figure 23, manually operated switches are provided for initiating movement of certain elements or mechanisms of the machine independently of the automatic cycling of the machine. The switches for performing these functions are indicated at 295, 296, 297 and 298. If manual control of machine functions is desired, switch 258 must be depressed or operated, which disconnects automatic cycle control circuits from current source; and switch 260 must be unlatched thereby establishing connection of switches 295, 296, 297 and 298 to current source. For example, with the pump in operation and the other mechanisms in static condition, the operator may desire to cause upward movement of clamps or arms 132. To accomplish this, the operator simply depresses the switch 295 to complete the circuit through the solenoid 282 which operates the valves to set up fluid flow to the lower end of the cylinder 110. The clamps will move until the operator removes pressure from the manual switch 295 breaking the circuit. If the operator desires to secure independent downward movement of the clamps, the manual switch 296 is closed completing an operative circuit through the solenoid 285 which in turn actuates the valve mechanism for directing fluid under pressure to the upper end of the cylinder 110. If the operator desires to secure movement of the carriage 62 in a direction to strip finished tubes from the arbor 75 or preform the edges of blanks as shown in Figure 8, the switch 297 may be depressed completing a circuit through the solenoid 280 which actuates the valve mechanism to direct fluid pressure through tube 206 to the right hand end of cylinder 50. If movement of the carriage 62 in the opposite direction is desired, the manually actuated switch 298 may be held closed by the operator to complete the circuit through the solenoid 284 which operates the hydraulic valve mechanism for directing pressure fluid through the tube 222 to the left hand end of cylinder 49 as shown in Figure 18.

As previously stated the circuit is provided with a master relay designated LCR-1 illustrated in Figure 23 which functions as a safety device in the event the machine does not operate properly, as for example, by reason of the presence of an irregularly shaped blank or the presence of more than one blank in superposed relation. In case of an emergency stopping of the machine, the relay LCR-1 locks out of disconnects the circuit which normally establishes the automatic cycling of the machine. The completion of the instant cycle may be accomplished by the operator through the manipulation of the manual switches 295, 296, 297 and 298 or one or more of the switches moved to circuit closing position until the machine cycle is completed. In the event of power failure during the cycling of the machine, the emergency stop switch 258 must be depressed or opened before current is restored in the circuit.

It is apparent that, within the scope of the invention, modifications and different arrangements may be made other than is herein disclosed, and the present disclosure is illustrative merely, the invention comprehending all variations thereof.

What we claim is:

1. In a device of the character disclosed, in combination, a frame; a carriage arranged for movement relative to said frame; means for supporting a metal blank; means associated with said carriage and adapted for bending edge portions of the blank to predetermined configuration when the carriage is moved in one direction, means for moving said blank supporting means to form the blank to tubular configuration; and means including a plurality of rolls carried by the carriage and engageable with the configurated edge portions of said blank for performing seaming operations upon said blank during movement of the carriage in another direction to form a tube.

2. In combination, a frame; a relatively stationary mandrel supported upon the frame; means for supporting metal blanks adjacent the mandrel; a carriage; means for moving the carriage parallel with the longitudinal axis of the mandrel and into engagement with the edges of the blanks for forming flanges thereon; an actuating mechanism for moving said blank supporting means to bend the blank around the mandrel, means including seam forming rolls associated with said carriage and engageable with said blank upon movement of the carriage in the opposite direction for completing the formation of tubes from said blanks, and means carried by said carriage for stripping finished tubes from the mandrel.

3. In a device of the character disclosed, in combination, a frame; a carriage reciprocably mounted upon the frame; a mandrel mounted upon the frame; a pair of members mounted adjacent the mandrel and adapted to support a sheet of metal to be formed; means including a plurality of form rolls mounted upon said carriage and adapted upon relative movement thereof in one direction to engage and configurate opposed edge portions of the metal sheet; means for moving the sheet supporting members in a direction to form the metal sheet around the mandrel; a plurality of seam forming rolls mounted upon said carriage; said seam forming rolls being arranged for engagement with the configurated edge portions of the metal sheet upon return movement of the carriage to its initial position for joining the configurated edge portions of the metal sheet to form a tube.

4. Apparatus for forming tubes from metal sheets including in combination, a frame; a mandrel carried by the frame; a carriage reciprocable in the direction of the longitudinal axis of the mandrel; a pair of members arranged adjacent the mandrel and being relatively movable with respect thereto; said members adapted to support a metal sheet from which a tube is to be formed; a plurality of rolls mounted upon the carriage and arranged to engage and configurate the edge portions of the metal sheet upon movement of the carriage in one direction; hydraulic means for actuating said carriage; hydraulic means for moving said members to bend the metal sheet around the mandrel, and means including seam forming rolls mounted upon said carriage and engageable with the configurated edges of the metal sheet upon return movement of the carriage to its initial position for completing the forming of a tube from the metal sheet.

5. In combination, a frame; a carriage mounted for relative movement with respect to said frame; an arbor carried by the frame; means for supporting a sheet metal blank adjacent the arbor; an hydraulic actuator for causing movement of said carriage relative to the frame; motion multiplying means connecting said hydraulic actuator to said carriage; said carriage being movable into engagement with a blank for configurating portions thereof; a second hydraulic actuator for operating said blank supporting means for bending said configurated blank around the arbor; said carriage being movable in another direction for engagement with the blank bent about the arbor to complete the formation of a tube from a blank, and electrically energized control means for said hydraulic actuators for initiating sequential movements of said carriage and blank supporting means.

6. A machine for forming tubes from metal sheets comprising in combination, a frame; a carriage reciprocably mounted upon the frame; a plurality of ways for guiding said carriage; an arbor mounted upon the frame; a pair of members extending in parallel relation with the arbor and adapted to receive a sheet of metal from which a tube is to be formed; a pair of sprockets journaled upon said frame in spaced relation; chain means overtaking said sprockets and connected to said reciprocable carriage; means for actuating the chain to reciprocate the carriage; means mounted upon said carriage and adapted upon movement of the carriage in one direction to engage and configurate opposed edge portions of the metal sheet; means for moving said members with respect to the arbor for bending the metal sheet around the arbor; cam means for controlling the path of movement of said members, and means supported upon said carriage and engageable with the configurated edge portions of the sheet to interlock the edge portions of the sheet to form a tube upon return movement of the carriage to its initial position.

7. An apparatus for forming tubes from metal sheets comprising a frame; a mandrel mounted upon said frame; a carriage mounted upon said frame and arranged for reciprocable movement in a direction axially of the mandrel; a pair of clamps arranged in parallelism with said mandrel and adapted to support metal sheets; an hydraulic actuator for moving said clamps; toggle linkage connecting said clamps with said actuator; cam means for controlling the path of movement of said clamps; means on said carriage and engageable with the opposed edge portions of the metal sheet for configurating the same during relative movement of the carriage in one direction; said clamps being arranged to bend the metal blanks around the mandrel after the initial movement of the carriage has configurated the edge portions of the sheet; means mounted upon said carriage and operable upon movement of the carriage to its initial position to engage the edges of the sheet while the latter is in engagement with the mandrel for interlocking the edges of the sheet to form a tube; said clamps being arranged to be moved to their initial position after said carriage has completed its cycle of operation, and means mounted upon the carriage and arranged for engagement with the formed tube for stripping the latter from the mandrel upon succeeding movement of the carriage.

JOHN W. MILLER.
ARTHUR J. BARRIE.

References Cited in the file of this patent

UNITED STATES PATENTS

| Number | Name | Date |
| --- | --- | --- |
| 33,190 | Fay | Sept. 3, 1861 |
| 430,266 | Briggs | June 17, 1890 |
| 563,255 | Briggs | July 7, 1896 |
| 567,033 | McNutt | Sept. 1, 1896 |
| 1,046,088 | Kruse | Dec. 3, 1912 |
| 1,506,276 | Stolp | Aug. 26, 1924 |
| 1,582,966 | Brinker | May 4, 1926 |
| 1,880,454 | Klocke | Oct. 4, 1932 |
| 1,921,200 | Mueller | Aug. 8, 1933 |
| 2,225,588 | Gartin | Dec. 17, 1940 |
| 2,254,708 | Nye | Sept. 2, 1941 |
| 2,327,440 | Maize | Aug. 24, 1943 |

FOREIGN PATENTS

| Number | Country | Date |
| --- | --- | --- |
| 3,957 | Great Britain | of 1909 |